(12) United States Patent
Kudryavtsev et al.

(10) Patent No.: US 9,953,678 B1
(45) Date of Patent: Apr. 24, 2018

(54) SERVO GRAY CODE QUALITY DETECTOR

(71) Applicant: Marvell International Ltd., Hamilton (BM)

(72) Inventors: Konstantin Kudryavtsev, Sunnyvale, CA (US); Gregory Burd, San Jose, CA (US); Mats Oberg, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/157,903

(22) Filed: May 18, 2016

Related U.S. Application Data (60) Provisional application No. 62/180,724, filed on Jun. 17, 2015.

(51) Int. Cl.
*G11B 20/18* (2006.01)
*G11B 20/12* (2006.01)
*G11B 20/10* (2006.01)
*G11B 5/012* (2006.01)

(52) U.S. Cl.
CPC .... *G11B 20/1833* (2013.01); *G11B 20/10305* (2013.01); *G11B 20/10472* (2013.01); *G11B 20/1217* (2013.01); *G11B 20/18* (2013.01); *G11B 5/012* (2013.01); *G11B 2020/1232* (2013.01); *G11B 2020/1863* (2013.01)

(58) Field of Classification Search
None
See application file for complete search history.

*Primary Examiner* — Brian Butcher (57) ABSTRACT

Various embodiments provide a Gray code detector that is not designed to look for a specific defect signature, but rather looks for wedges that are in error or close to being in error, as determined through a probabilistic analysis that considers the mean and sigma of a minimum Viterbi Metric Margin (minVMM) distribution of a servo wedge relative to a defined threshold for a Wedge Error Rate (WER).

25 Claims, 11 Drawing Sheets

| VMM$_0$ | | VMM$_3$ | VMM$_4$ | VMM$_5$ | |
|---|---|---|---|---|---|
| 0 | 0 | 1 | 0 | 1 | 1 | ... |
| 0 | 0 | 1 | 0 | 0 | 1 | ... |

Ignore these VMM when determining SERVO wedge Quality

SERVO GRAY CODE QUALITY DETECTOR

RELATED APPLICATIONS

This application claims priority to U.S. Provisional Patent Application Ser. No. 62/180,724 filed Jun. 17, 2015, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Magnetic storage systems such as hard disk drives are used to store data. The hard disk drives include one or more platters with an outer magnetic coating. The magnetic coating stores positive and negative magnetic fields that represent binary 1's and 0's. The platters are divided into concentric circles called tracks. The tracks are divided radially into sectors.

When the hard disk drives are manufactured, a servo writer writes permanent servo wedges onto the platters between the sectors. The servo wedges contain data that is used by a HDD to locate the tracks and data sectors. The information stored in SERVO wedge includes track ID and sector ID's that are coded using Gray code.

Gray code represents consecutive decimal numbers using binary expressions that differ by only one bit. For example, the decimal numbers 0 and 1 can be represented by the binary Gray code numbers 00 and 01, respectively. The decimal number 2 can be represented by the binary Gray code number 11. The decimal number 3 can be represented by the binary Gray code number 10.

Throughout the lifetime of a disk the servo data will be read repeatedly, with read noise varying from read to read. Gray code quality checks are performed to identify wedges that are error prone. Gray code quality may be reduced for a number of reasons including media defect, strong jitter noise realization, and the like.

SUMMARY

This summary is provided to introduce subject matter that is further described below in the Detailed Description and Drawings. Accordingly, this Summary should not be considered to describe essential features nor used to limit the scope of the claimed subject matter.

Various embodiments provide a gray code quality detector that is not designed to look for a specific defect signature, but rather looks for wedges that are in error or close to being in error, as determined through a probabilistic analysis that considers the mean and sigma of a minimum Viterbi Metric Margin (minVMM) distribution of a servo wedge relative to a defined threshold for a Wedge Error Rate (WER).

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

This disclosure describes apparatuses and techniques for detecting the quality of Gray code associated with a servo wedge. The inventive Gray code quality detector is not designed to look for a specific defect signature. Rather, the Gray code quality detector looks for wedges that are in error or close to being in error, as determined through a probabilistic analysis that considers the mean and sigma of a minimum Viterbi Metric Margin (min VMM) distribution of a servo wedge relative to a defined threshold for a Wedge Error Rate (WER).

As context for the discussion of the inventive embodiments below, consider now some operational principles associated with magnetic data storage and disks.

Figure 1:
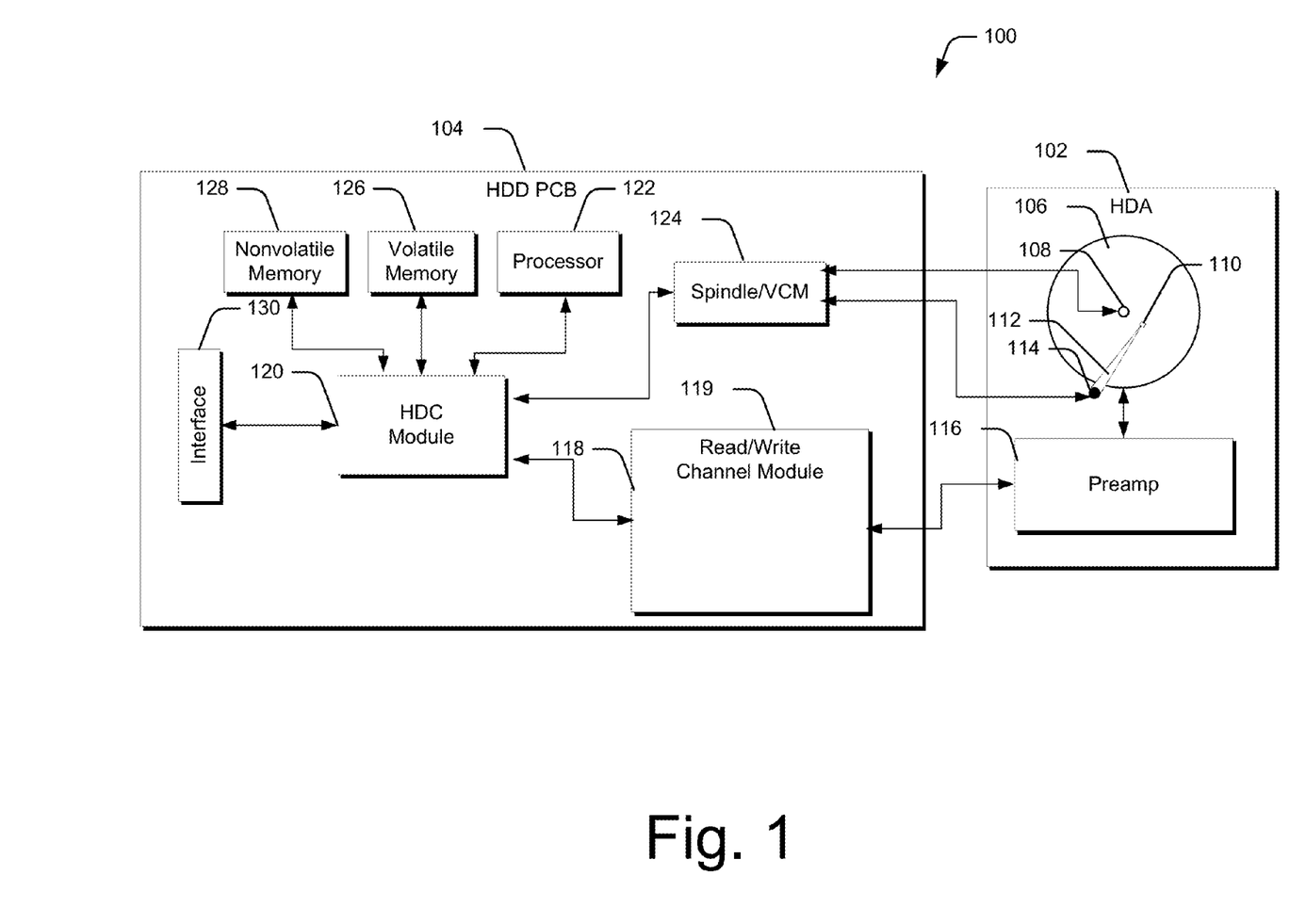
FIG. 1 is a block diagram of a hard disk drive.

In FIG. 1, a hard disk drive (HDD) system 100 includes a hard disk assembly (HDA) 102 and an HDD printed circuit board (PCB) 104. The HDA 102 includes one or more circular platters (i.e., disks) 106, which have magnetic surfaces that are used to store data magnetically. The platters 106 are arranged in a stack, and the stack is rotated by a spindle motor 108. At least one read/write head assembly (hereinafter, "head") 110 reads data from and writes data on the magnetic surfaces of the platters 106 in various implementations.

The head 110 includes a write head portion (or, "write head"), such as an inductor, that generates a magnetic field and a read head portion (or, "read head"), such as a magneto-resistive (MR) element, that senses the magnetic field on the platters 106. The head 110 is mounted at a distal end of an actuator arm 112. An actuator, such as a voice coil motor (VCM) 114, moves the actuator arm 112 relative to the platters 106.

The HDA 102 includes a preamplifier 116 that amplifies signals received from and sent to the head 110. The preamplifier 116 generates a write current that flows through the write head of the head 110 when writing data. The write current is used to produce a magnetic field on the magnetic surfaces of the platters 106. Magnetic surfaces of the platters 106 induce low-level analog signals in the read head of the head 110 during reading of the platters 106. The preamplifier 116 amplifies the low-level analog signals and outputs amplified analog signals to a read/write channel module 118.

The HDD PCB 104 includes the read/write channel module 118, a hard disk control (HDC) module 120, a processor 122, a spindle/VCM driver module 124, volatile memory 126, nonvolatile memory 128, and an input/output (I/O) interface 130.

During write operations, the read/write channel module 118 may encode the data to increase reliability by using error-correcting codes (ECC) such as a run length limited (RLL) code, a LDPC code, etc. The read/write channel module 118 then transmits the encoded data to the preamplifier 116. During read operations, the read/write channel module 118 receives analog signals from the preamplifier 116. The read/write channel module 118 converts the analog signals into digital signals, which are decoded to recover the original data. In the illustrated and described embodiment, the read/write channel module 118 includes a Gray code quality detection module (GCQD) 119 that operates as described below.

The HDC module 120 controls operation of the HDD system 100. For example, the HDC module 120 generates commands that control the speed of the spindle motor 108 and the movement of the actuator arm 112. The spindle/VCM driver module 124 implements the commands and generates control signals that control the speed of the spindle motor 108 and the positioning of the actuator arm 112. Additionally, the HDC module 120 communicates with an external device (not shown), such as a host adapter within a host device, via the I/O interface 130. The HDC module 120 may receive data to be stored from the external device, and may transmit retrieved data to the external device.

The processor 122 processes data, and performs functions including encoding, decoding, filtering, and/or formatting. Additionally, the processor 122 processes servo or positioning information to position the head 110 over the platters 106 during read/write operations. Servo information, which is stored on the platters 106, ensures that data is written to and read from correct locations on the platters 106. HDDs generate position feedback signals from special magnetic patterns called servo patterns that are written in designated areas on the disk surface known as servo sectors. The servo information (Gray code) may be written as part of the manufacturing process and then never subsequently modified. However, Gray code can, over time, be susceptible to quality issues stemming from media defects, strong jitter noise realization, and the like. The position feedback signals are called position error signals (PES). The closed-loop servomechanism decodes the position information written in these sectors to position the head at a desired position relative to the track being read.

Figure 2:
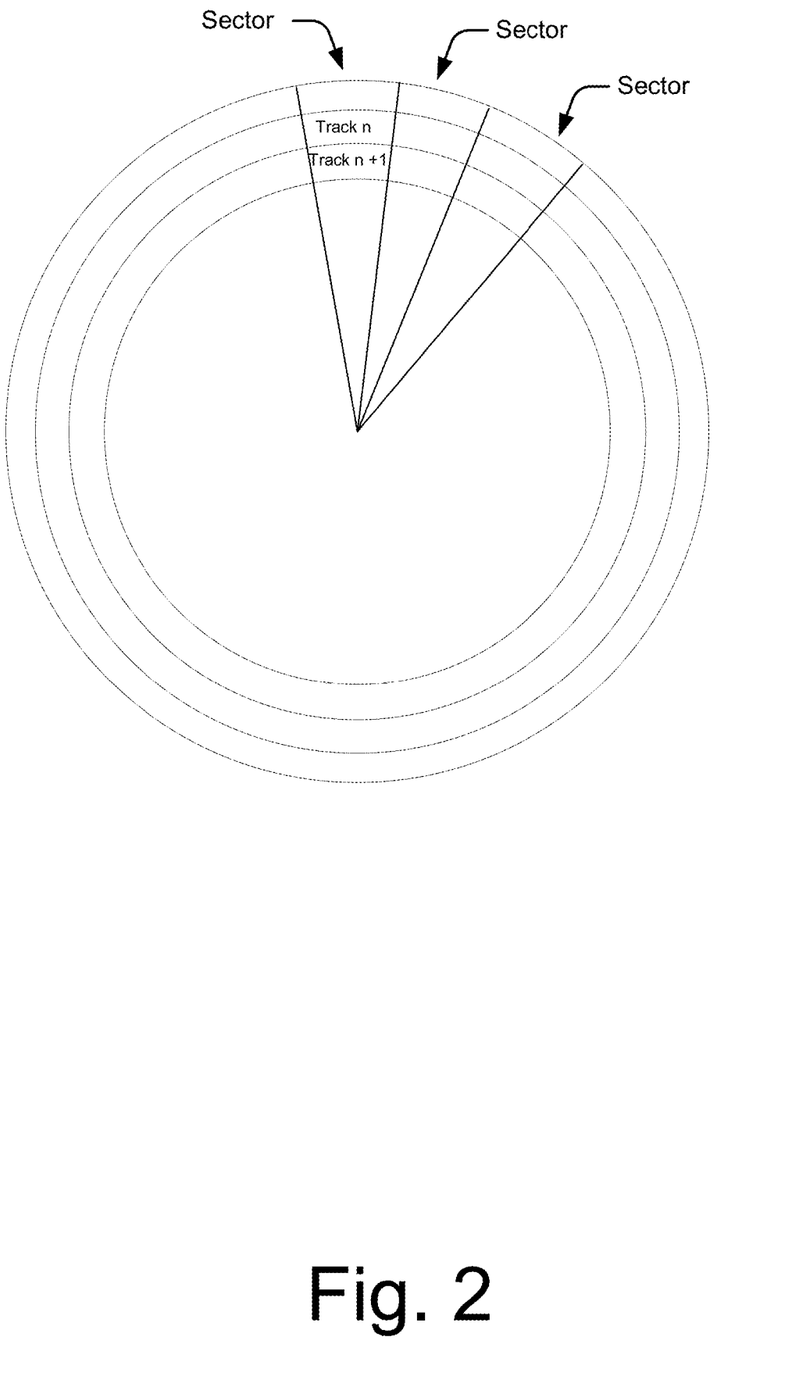
FIG. 2 illustrates tracks and sectors of a disk of a hard disk drive.

In FIG. 2, the HDD system 100 stores data on each of the platters 106 in concentric tracks, which are divided into sectors. The head 110 flies over the platters 106 and senses a magnetic field stored on the disk positioned over a certain track.

Figure 3:
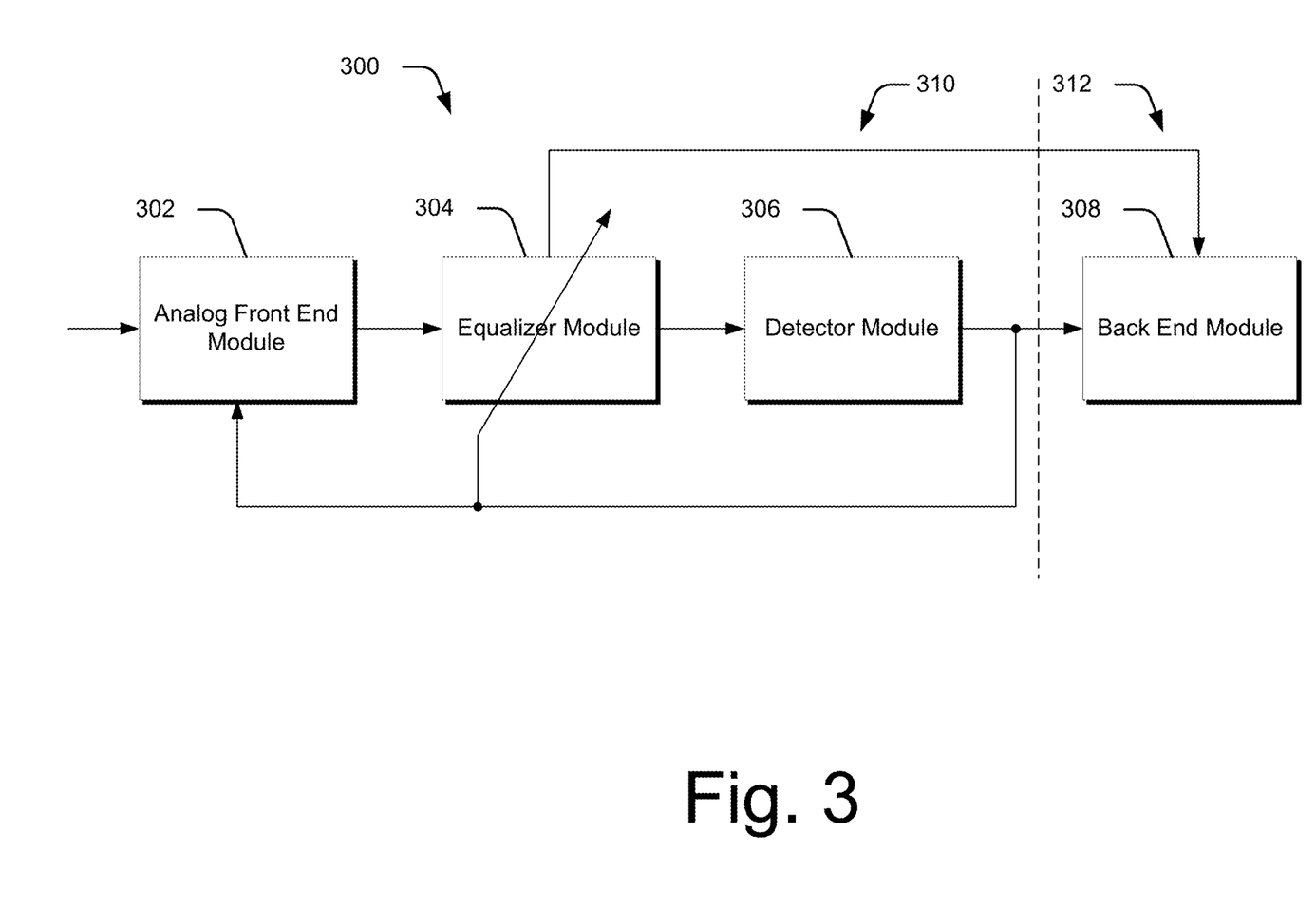
FIG. 3 illustrates a block diagram of an example read channel.

In FIG. 3, a receiver 300 includes an analog front end (AFE) module 302, an equalizer module 304, a detector module 306, and a back end module 308. A continuous-time signal is read from the disk and is processed by the AFE module 302. The AFE module 302 conditions and samples the continuous-time signal and outputs a discrete-time signal. The equalizer module 304 receives an output of the AFE module 302 and performs equalization to a predetermined target. A detector module 306 receives an output of the equalizer module and decodes data. For example only, the detector module 306 may include a sequence detector such as a Viterbi detector. An output of the detector module 306 is used to control the equalizer module 304 and control adaptation of the AFE module 302. Components of the receiver 300 up to and including the detector module 306 are identified in FIG. 3 as a front-end section 310 and components after the detector module 306 are identified in FIG. 3 as a back-end section 312.

A user data portion of the output of the equalizer module 304 is further processed by the back end module 308. The back end module 308 may perform more sophisticated detection and decoding for the purpose of error correction. The AFE module 302 performs automatic gain control (AGC) to adjust gain. The equalizer module 304 may also be adaptive. Adaptation in the AFE module 302 and the equalizer module 304 typically use minimum mean square error (MMSE) criteria.

For a given track, channel SNR can change from one sector to another sector due to variations in the signal or in the noise. For instance, the SNR changes with read head fly height (i.e., distance between head and platter). The SNR also changes with the amount of inter-track interference (ITI). While the AGC in the AFE module 302 and the equalizer module 304 are optimal or near optimal for the detector module 306, the output of the equalizer module 304 may not be the optimal for the back end section 308.

Figure 4:
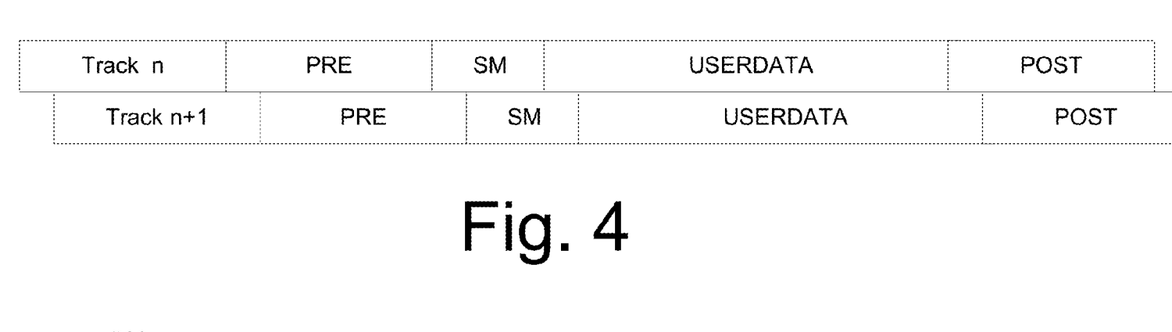
FIG. 4 illustrates a representation of portions of data stored on two adjacent tracks.

In FIG. 4, for each data sector, preamble (PRE), syncmark (SM), user data (USERDATA) and post-amble (POST) fields are written on the disk. Two sectors are written on neighboring tracks from FIG. 2 and are identified as track n and track n+1. Typically, sectors on adjacent tracks are closely aligned. As the recording density increases, the distance between two neighboring tracks may decrease. When reading track n, the read head may also pick up a signal from one or more neighboring tracks—for example, track n+1. This phenomenon is called inter-track interference (ITI). The overall read-back signal may be modeled as the weighted sum of track n and track n+1 as set forth below:

$$r_n = (1-\alpha)y_n + \alpha y_{n+1}$$

where $r_n$ is the read-back signal, $y_n$ is the signal from track n, $y_{n+1}$ is the signal from track n+1, and $\alpha$ is an off-track percentage factor.

Figure 5:
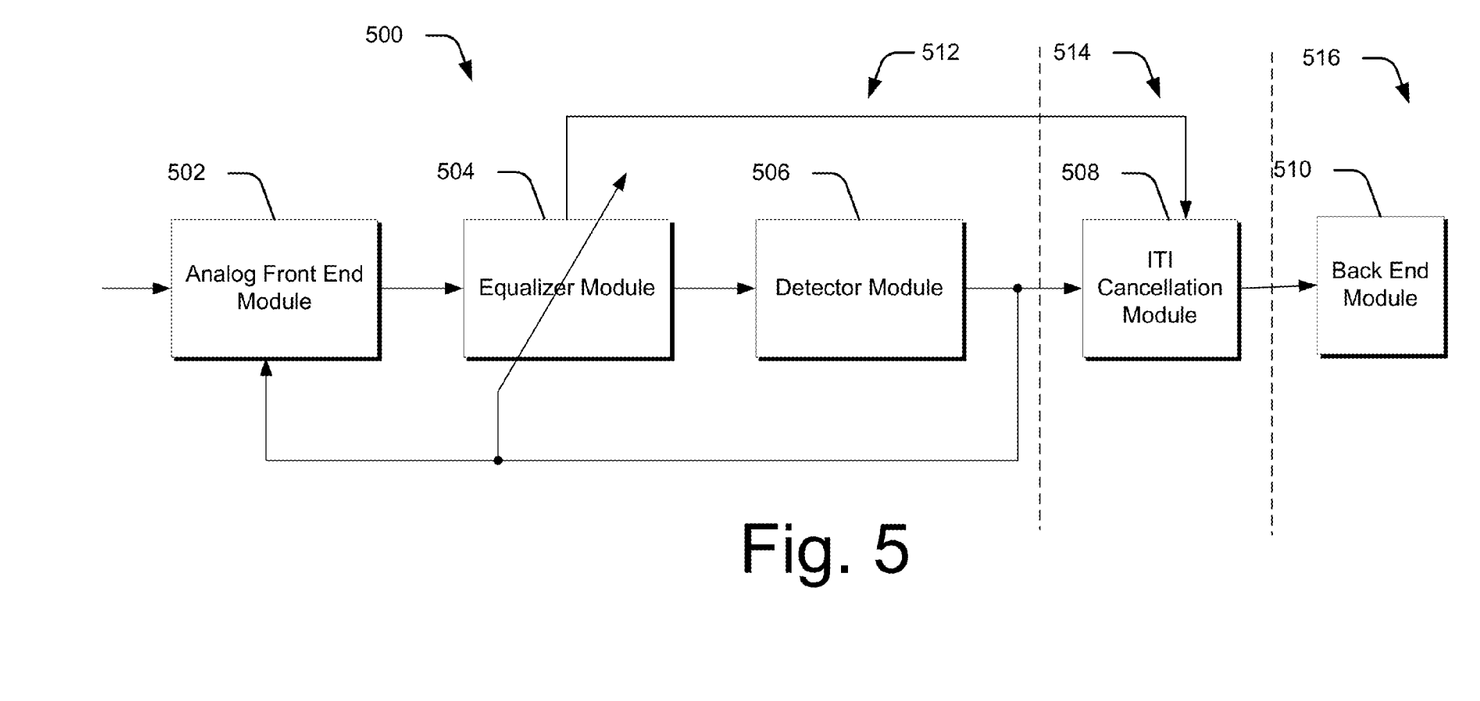
FIG. 5 illustrates a read channel having inter-track interference cancellation.

In FIG. 5, a receiver 500 with inter-track interference cancellation is shown. The inter-track interference cancellation may be applied as a post processing step. The receiver 500 includes an analog front end (AFE) module 502, an equalizer module 504, a detector module 506, an inter-track interference cancellation module 508 and a back end module 510. A front end section 512 includes the AFE module 502, the equalizer module 504, and the detector module 506. A post processing section 514 includes the inter-track interference cancellation module 508. A back end section 516 includes the back end module 510. The inter-track interference cancellation module 508 treats inter-track interference as noise introduced in the front end section 512.

To more effectively combat inter-track interference, two or more read sensors may be used on a single head assembly. The multiple read sensors may provide signals that allow for the cancellation of inter-track interference components and/or the amplification of the desired read signal without amplifying the undesired inter-track interference.

While the platters are rotating, the amount of inter-track interference as the read head follows a track may indicate the position of the read head relative to the data track. The amount of inter-track interference may indicate how far off from the desired position the read head is and a corresponding position error signal (PES) can be generated. The position error signal can be used in the servo control loop to adjust the head (such as using a voice coil motor, as described above).

The position error signal may allow the track to be followed more accurately in between servo wedges. In addition or alternatively, the servo wedges may be included less frequently, thereby allowing more room for user data.

Having considered various operational characteristics of magnetic storage systems and disks, consider now servo Gray code quality detection in accordance with one or more embodiments.

Gray Code Quality Detection

The discussion below starts with the definition of a Wedge Error Rate (WER) and how the WER can be predicted using a Viterbi Metric Margin (VMM). Histograms based upon VMM analysis are developed and can be used to characterize good quality wedges and poor quality wedges. The histograms approximate a distribution which can be analyzed for its standard deviation or sigma and mean. Poor quality wedges can be defined as a function of the sigma and mean of their associated distributions. Based on this framework, two separate distributions can be defined—one representing poor quality wedges and another representing good quality wedges. A threshold between the distributions can be defined and used to determine or declare the quality of a selected wedge that is read.

In various embodiments, a poor quality wedge is defined in terms of its Wedge Error Rate (WER). A servo wedge is said to be of poor quality if its WER is greater than a defined threshold, represented as THR_GC_QUAL. The threshold can be defined in any suitable way and, in some instances, can be defined by a user. For example, a user might define a threshold value of 1e-2 or 0.01.

The WER of a particular servo wedge can be obtained in different ways. First, the WER might be obtained by reading the same servo wedge multiple times. In practice, however, this may not be practical. For example, for a WER of 1e-2, one may need to read the same servo wedge 1000 or more times. As this is somewhat impractical, a second way the WER may be obtained is through the use of a predictor that is used to predict wedge error rates. Any suitable type of predictor can be utilized. In at least some embodiments, a predictor in the form of a Viterbi Metric Margin (VMM) is used. The VMM is a numeric value representing the probability that an alternative path (other than maximum likelihood path) is selected by a Viterbi detector. The VMM directly represents the error rate. The VMM is measured by a Viterbi detector (not depicted) provided in the read and write channel. Typically, the VMM of a Gray code bit is defined as the difference or delta between a Viterbi path (maximum likelihood path) and an alternative path, as will be appreciated by the skilled artisan.

The size of the VMM is related to the reliability of the underlying Viterbi decision. If the VMM is large, then the Viterbi decision is reliable. If the VMM is small, then the Viterbi decision is unreliable. In one or more embodiments, the minimum VMM or minVMM is defined as follows:

$$minVMM = \begin{cases} \min_{k \in wedge}(VMM_k), & \text{if wedge is error free} \\ 0, & \text{else} \end{cases}$$

Here, k corresponds to each Gray code bit. So, for all Gray code bits within a servo wedge, the smallest VMM is found. This is done only if the wedge is error free. If the wedge is not error-free, then the minVMM is set to 0. The reason for this is that wedges with a small minVMM will subsequently be classified as having poor quality. Thus, if a wedge is known to be demodulated with errors, then by definition it is of poor quality. Therefore, the wedge is assigned a "0".

The expected value of the minVMM is represented as E(minVMM), and is defined to be the average of the minVMM over many reads of a servo wedge. The E(minVMM) can be estimated in different ways. For example, on a disk, E(minVMM) can be found by reading the same wedge multiple times, recording minVMM after each read, and finding the mean value. Alternately, software simulation can be utilized and a fast E(minVMM) can be obtained by reading a wedge once without read noise, i.e. with write noise only.

Figure 6:
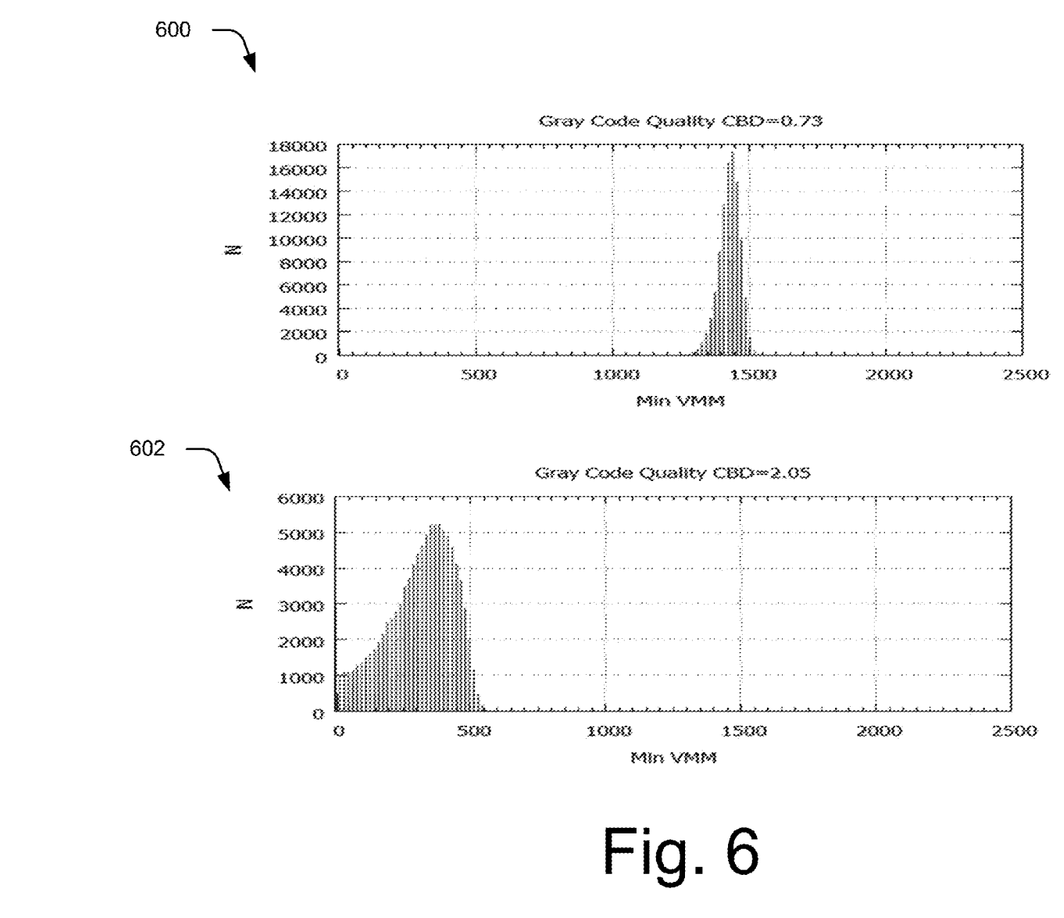
FIG. 6 illustrates various histograms that represent good quality servo wedges and poor quality servo wedges.

FIG. 6 illustrates two histograms 600, 602 that relate VMM to WER. Histogram 600 represents the minVMM histogram for good quality wedges. Histogram 602 represents the minVMM histogram for poor quality wedges. For good quality wedges in this example, the minVMM hovers slightly below 1500. For poor quality wedges in this example, the minVMM is almost always below 500.

Notice that each of the minVMM histograms roughly follows a Gaussian distribution having a mean and a standard deviation (sigma), for some values of mean and sigma. In this case, Mean=$E$(minVMM); and Sigma=sigma(minVMM)

From this, it follows that the probability of a wedge being read in error can be estimated based on the mean and sigma over multiple reads. Therefore, poor quality wedges can be alternatively defined as a function of the mean and sigma of the minVMM distribution. This leads to the following definition:

Definition: a servo wedge is said to be of poor quality if the mean and sigma of its minVMM distribution satisfy:

$P(N(\text{mean,sigma})<0)>$TRH_GC_QUAL

Exploring this definition, a servo wedge is said to be of poor quality if the probability of its normal distribution being less than zero is greater than a defined threshold, here TRH_GC_QUAL. As an example, consider histogram 602. As noted above, this histogram roughly approximates a normal distribution for poor quality wedges. The mean for histogram 602 is somewhere around 300 and an assumed standard deviation corresponding to this mean would be around 75. Using these values, the probability of the distribution becoming negative can be computed.

Figure 7:
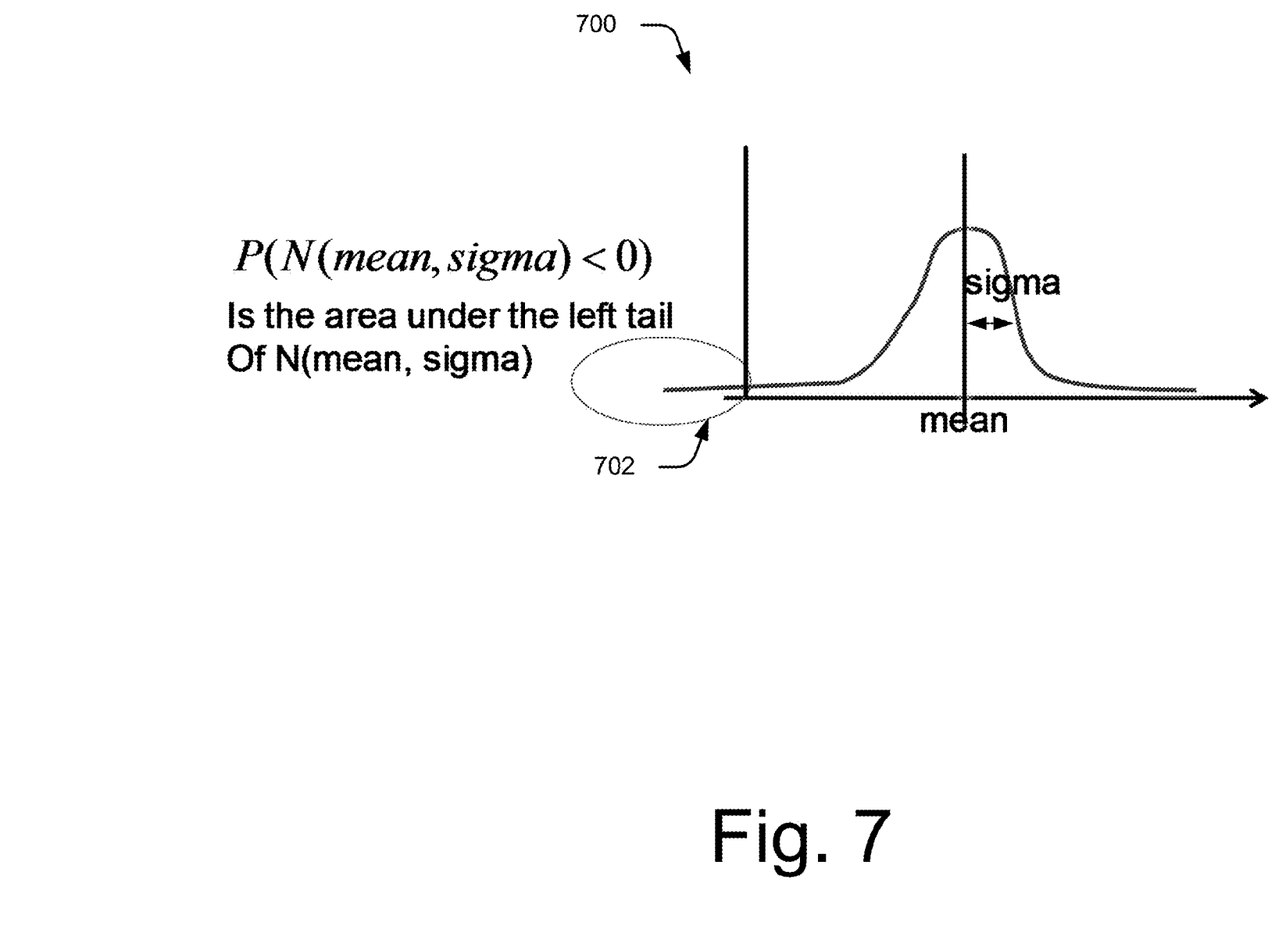
FIG. 7 illustrates a distribution that is useful in considering probabilistic considerations in accordance with one or more embodiments.

As an example and further embellishment of the previous paragraph, consider FIG. 7. There, an example Gaussian distribution is shown generally at 700. The Gaussian distribution includes a mean and a standard deviation or sigma. The probability of the Gaussian distribution becoming negative corresponds to the area under the left tail of the normal distribution—here, designated 702.

Using the above information, a poor quality wedge can be found as follows. Since the servo wedge is a write once media, only the read noise changes from read to read of the wedge. Therefore, the variance of the minVMM distribution is only a function of the read noise. As such, good and poor quality wedges have the same sigma of the minVMM distribution. Now, a wedge can be selected and the sigma of its minVMM can be measured. The threshold TRH_GC_QUAL for a poor wedge can be set, e.g., 1e-2, where the wedge error rate WER would be at or above 1e-2. Now, the equation:

$$P(N(mean, sigma) < 0) > TRH\_GC\_QUAL$$

can be solved for a mean. That is, the sigma and threshold TRH_GC_QUAL are known. The mean can now be found that makes this equation true. From this, we now have the mean and sigma that defines a poor quality wedge.

Figure 8:
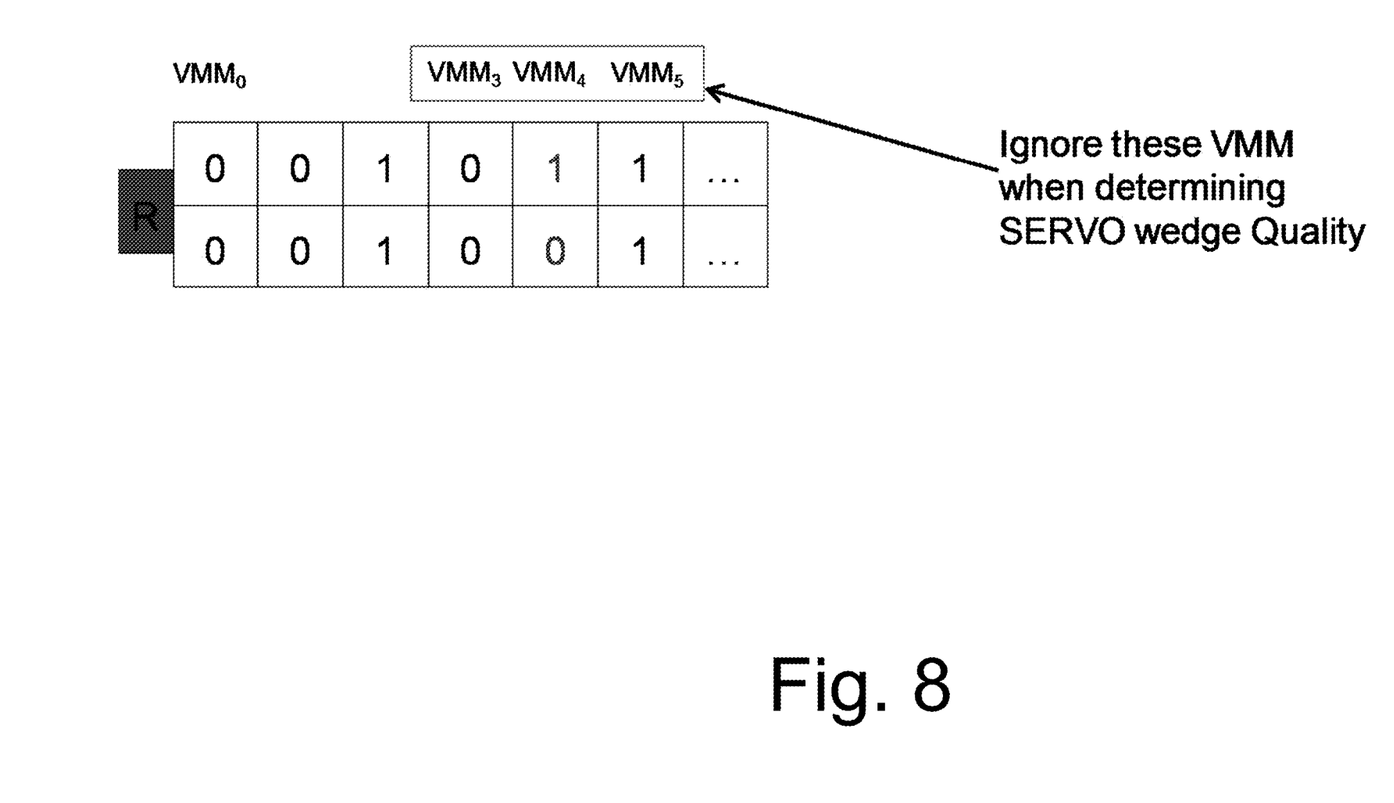
FIG. 8 illustrates a read head and two servo tracks in accordance with one or more embodiments.

Consider now some implications of Gray code coding with respect to computation of the VMM. When reading servo information, the read head is typically not positioned on-track relative to the servo track. As such, the reader will generally pick up signals from two servo tracks. As an example, consider FIG. 8 which shows a read head (R) positioned between two servo tracks. In general, the servo Gray code field is the same on the two adjacent tracks with the exception of a single Gray code bit—here, the fifth bit from the left. As a result, the bit positions that differ between the two tracks is often read as an error or to imply poor quality. Subsequently it is desirable to exclude VMM computations around the bit that differs between the two tracks to avoid falsely identifying a wedge as poor. In this case, the read head does not have knowledge of bit positions that differ between the two tracks. Therefore, the servo controller ensures that the corresponding VMMs are excluded. In this case, the excluded VMMs would correspond to the fourth, fifth and sixth bits from the left.

Given the discussion above and the framework that has been presented to describe the definition of a poor quality wedge in terms of the minVMM distribution, consider now a Gray code quality detector built upon this framework.

Gray Code Quality Detector

The challenge of developing a Gray code quality detector based on the framework introduced above pertains to being able to separate two approximated normal distributions: one corresponding to good wedges, and the other corresponding to poor wedges. As an example, consider FIG. 9 which illustrates two normal distributions 900, 902. Distribution 900 corresponds to the minVMM distribution for good wedges, while distribution 902 corresponds to the minVMM distribution for poor wedges. Thus, a distribution with a statistical center less than mean* is poor by definition.

Figure 9:
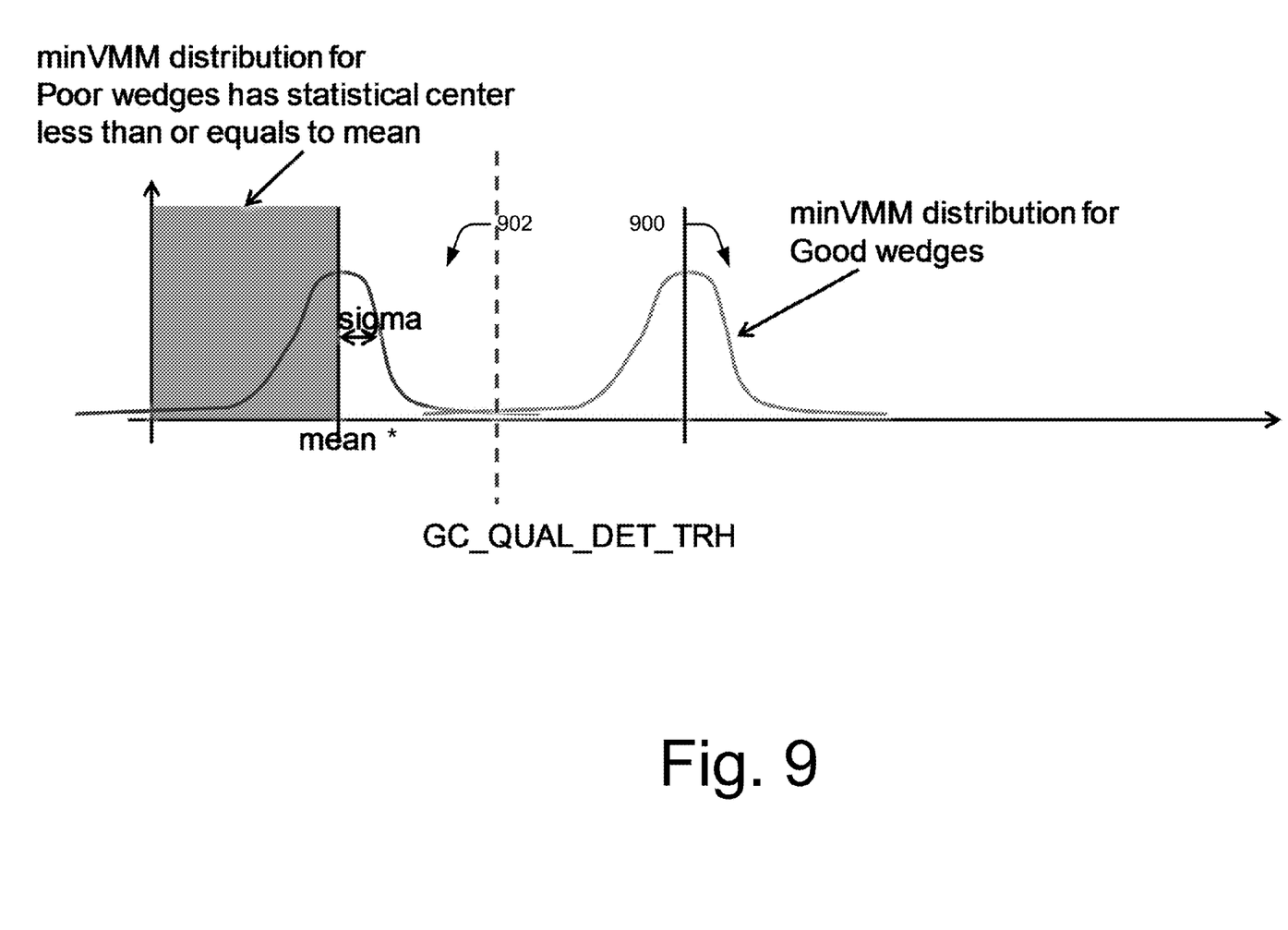
FIG. 9 illustrates two distributions and a defined threshold between the two distributions in accordance with one or more embodiments.

By looking at the normal distributions 900, 902, a Gray code quality detector threshold—GC_QUAL_DET_TRH—can be defined. In the illustrated and described embodiment, the GC_QUAL_DET_TRH is defined as follows:

$$GC\_QUAL\_DET\_TRH = mean^* + z^*sigma, \text{ where } z \text{ may be set to a number in the range between 3 and 6}$$

Thus, if we take minVMM distribution 902 with mean* and sigma, and read this wedge one and compute minVMM statistics, then it may fall to the right of mean* with good probability. So GC_QUAL_DET_THR should be chosen to guarantee that for a poor quality wedge, for example, the probability that minVMM>GC_QUAL_DET_THR<0.005. This in general can be expressed as GC_QUAL_DET_THR=mean*+z*sigma, for an appropriate choice of z. To detect good and poor quality wedges, a wedge is read and its minVMM is measured. If the minVMM is greater than the Gray code quality detector threshold (i.e. lies above the dashed line in FIG. 9), then the wedge can be declared to have good quality. If, on the other hand, the minVMM is less than the Gray code quality detector threshold, the wedge can be declared to have poor quality.

When a wedge is declared to be of poor quality, several things can be done. For example, it may be decided to rewrite a poor quality wedge. Another option for a poor quality wedge is to mark the wedge as such and not necessarily use or rely on the data on the wedge. Another option is to use the data from the wedge, but to realize the data has a lower trust level.

Figure 10:
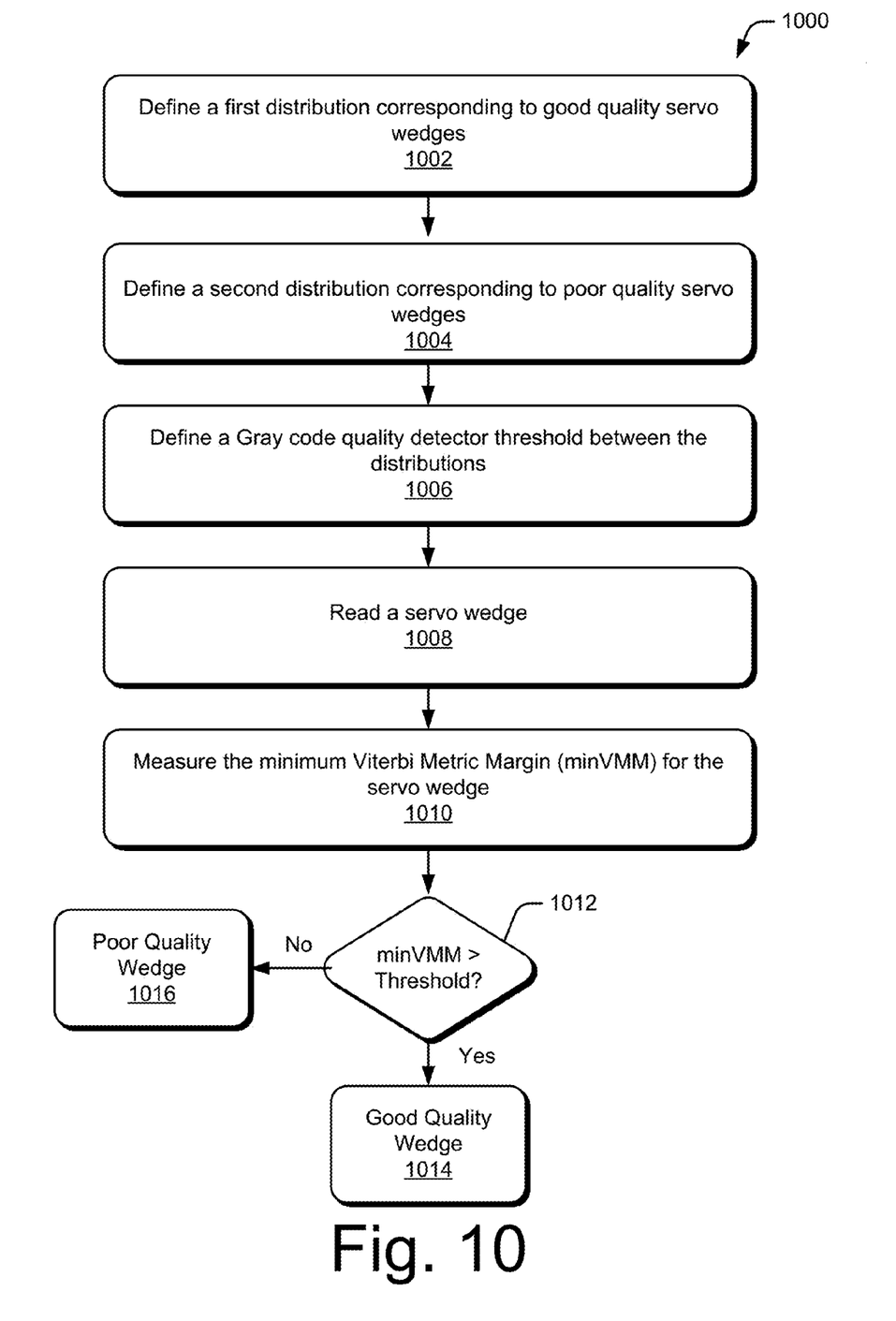
FIG. 10 is a flow diagram that describes operations in a method in accordance with one or more embodiments.

FIG. 10 is a flow diagram 1000 that describes operations in a method in accordance with one or more embodiments. The method can be performed by any suitable software, hardware, firmware, or combination thereof. In at least some embodiments aspects of the method can be performed, at least in part, by a Gray code quality detector such as one described above and below.

A first distribution corresponding to good quality servo wedges is defined (block 1002). Any suitable distribution can be used, examples of which are provided above. A second distribution corresponding to poor quality servo wedges is defined (block 1004). Any suitable distribution can be used, examples of which are provided above. A Gray code quality detector threshold is defined between the distributions (block 1006). This threshold can be defined in any suitable way including taking into account such considerations as reducing or minimizing false alarms (such as when the threshold is set too high) or missing poor cases (such as by setting the threshold to low). In at least some embodiments, the threshold is selected as a certain number of standard deviations (sigma) away from the mean of the distribution for the poor quality wedges.

A servo wedge is read (block 1008) and its minimum Viterbi Metric margin (minVMM) is measured (block 1010). There is a VMM value associated with each Gray code bit from the Viterbi detector. The minVMM is the minimum of such VMM values for one servo wedge. The measured minVMM is compared against the Gray code quality detector threshold (block 1012). If the minVMM of the servo wedge is greater than the Gray code quality detector threshold, the servo wedge is declared a good wedge (block 1014). If, on the other hand, the minVMM is less than the Gray code quality detector threshold, the servo wedges declared a poor quality wedge (block 1016).

The following discussion describes an operating environment and a System-on-Chip (SoC) in which components described above can be embodied. In the discussion below, reference is made to the operating environment by way of example only.

Operating Environment

Figure 11:
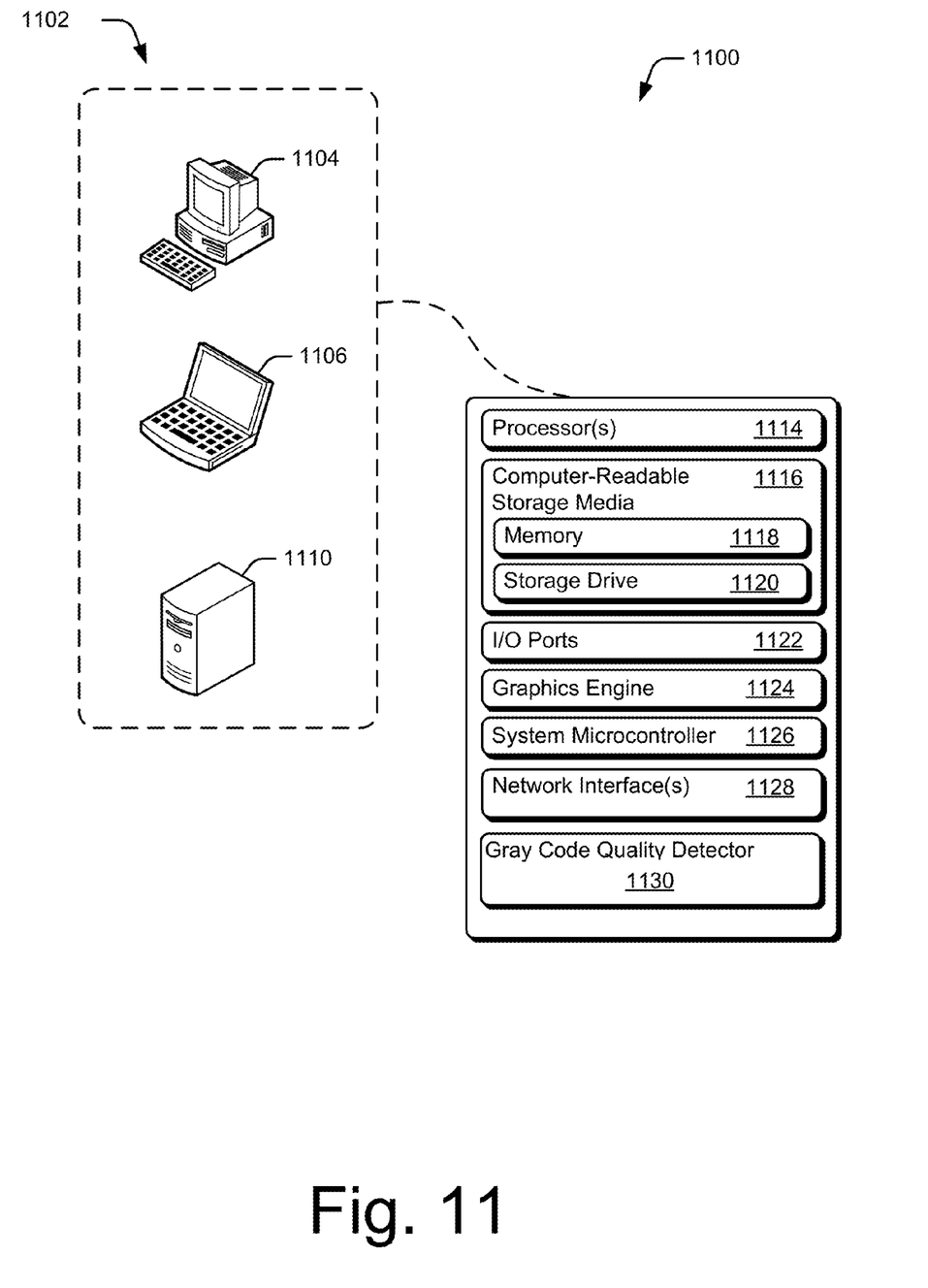
FIG. 11 illustrates an example operating environment in accordance with one or more embodiments.

FIG. 11 illustrates an example operating environment in accordance with one or more embodiments generally at 1100. The environment can include multiple types of devices 1102 that can use the inventive principles described herein.

Devices 1102 can include desktop computer 1104, laptop computer 1106, server 1110, as well as a variety of other devices.

Each device 1102 includes processor(s) 1114 and computer-readable storage media 1116. Computer-readable storage media 1116 may include any type and/or combination of suitable storage media, such as memory 1118 and storage drive(s) 1120. Memory 1118 may include memory such as dynamic random-access memory (DRAM), static random access memory (SRAM), read-only memory (ROM), or Flash memory (not shown) useful to store data of applications and/or an operating system of the device 1102. Storage drive(s) 1120 may include hard disk drives and/or solid-state drives (not shown) useful to store code or instructions associated with an operating system and/or applications of device. Processor(s) 1114 can be any suitable type of processor, either single-core or multi-core, for executing instructions or commands of the operating system or applications stored on storage drive(s) 1120.

Devices 1102 can also each include I/O ports 1122, graphics engine 1124, system microcontroller 1126, network interface(s) 1128, and a Gray code quality detector 1130 that operates as described above and below.

I/O ports 1122 allow device 1102 to interact with other devices and/or users. I/O ports 1122 may include any combination of internal or external ports, such as audio inputs and outputs, USB ports, Serial ATA (SATA) ports, PCI-express based ports or card-slots, and/or other legacy ports. I/O ports 1122 may also include or be associated with a packet-based interface, such as a USB host controller, digital audio processor, or SATA host controller. Various peripherals may be operatively coupled with I/O ports 1122, such as human-input devices (HIDs), external computer-readable storage media, or other peripherals.

Graphics engine 1124 processes and renders graphics for device 1102, including user interface elements of an operating system, applications, command interface, or system administration interface. System microcontroller 1126 manages low-level system functions of device 1102. Low-level system functions may include power status and control, system clocking, basic input/output system (BIOS) functions, switch input (e.g. keyboard and button), sensor input, system status/health, and other various system "housekeeping" functions. Network interface(s) 1122 provides connectivity to one or more networks Gray code quality detector is representative of functionality that enables the quality of Gray code to be determined in a manner as described above.

Having considered the above embodiments, consider now a system-on-a-chip that can be utilized in accordance with one or more embodiments.

System-on-Chip

Figure 12:
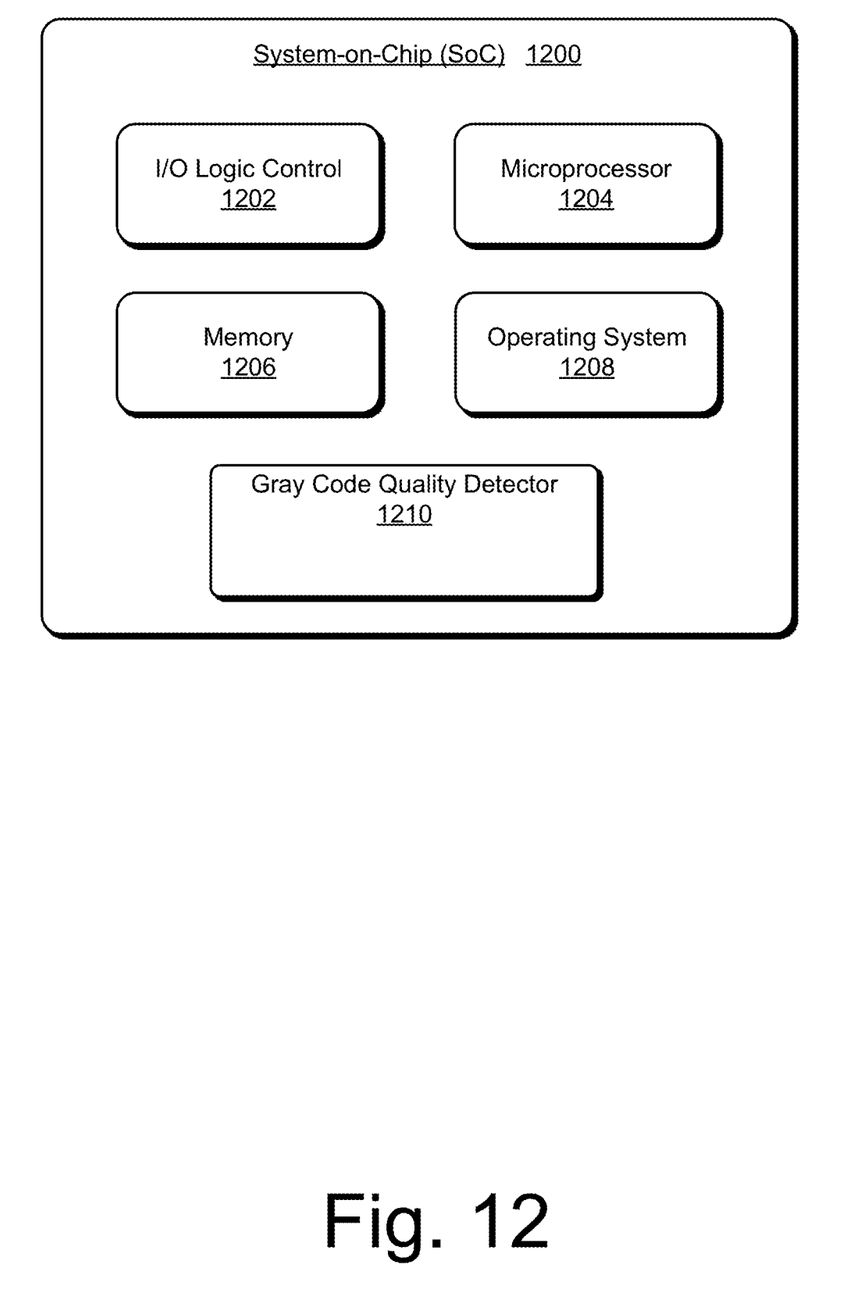
FIG. 12 illustrates a System-on-Chip (SoC) environment for implementing aspects of the techniques described herein.

FIG. 12 illustrates a System-on-Chip (SoC) 1200, which can implement various embodiments described above. A SoC can be implemented in any suitable device that utilizes magnetic recording media and Gray code.

SoC 1200 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 1200 can also include an integrated data bus (not shown) that couples the various components of the SoC for data communication between the components. A wireless communication device that includes SoC 1200 can also be implemented with many combinations of differing components. In some cases, these differing components may be configured to implement concepts described herein over a wireless connection or interface.

In this example, SoC 1200 includes various components such as an input-output (I/O) logic control 1202 (e.g., to include electronic circuitry) and a microprocessor 1204 (e.g., any of a microcontroller or digital signal processor). SoC 1200 also includes a memory 1206, which can be any type of RAM, SRAM, low-latency nonvolatile memory (e.g., flash memory), ROM, and/or other suitable electronic data storage. SoC 1200 can also include various firmware and/or software, such as an operating system 1208, which can be computer-executable instructions maintained by memory 1206 and executed by microprocessor 1204. SoC 1200 can also include other various communication interfaces and components, communication components, other hardware, firmware, and/or software.

SoC 1200 includes Gray code quality detector 1210 that operates as described above.

CONCLUSION

Various embodiments provide a gray code detector that is not designed to look for a specific defect signature, but rather looks for wedges that are in error or close to being in error, as determined through a probabilistic analysis that considers the mean and sigma of a minimum Viterbi Metric Margin (minVMM) distribution of a servo wedge relative to a defined threshold for a Wedge Error Rate (WER).

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method performed by a computing device, the method comprising:
    defining, by the computing device, a first distribution corresponding to good quality servo wedges;
    defining, by the computing device, a second distribution corresponding to poor quality servo wedges;
    defining, by the computing device, a Gray code quality detector threshold between the first and second distributions; and
    causing, by the computing device, a Gray code quality detector to perform operations comprising:
        reading a servo wedge; and
        using the Gray code quality detector threshold to ascertain whether the servo wedge is a good quality wedge or a poor quality wedge.

2. The method of claim 1, wherein the first and second distributions are Gaussian distributions.

3. The method of claim 1, wherein the first and second distributions are minimum Viterbi Metric Margin distributions.

4. The method of claim 1, wherein the operations further comprise measuring a metric for the servo wedge and determining whether the metric is above or below the Gray code quality detector threshold.

5. The method of claim 1, wherein the operations further comprise measuring a minimum Viterbi Metric Margin for the servo wedge, and determining whether the minimum Viterbi Metric Margin is above or below the Gray code quality detector threshold.

6. The method of claim 1, wherein said defining a second distribution corresponding to poor quality servo wedges comprises computing a normal distribution that satisfies the following equation:

$$P(N(\text{mean},\text{sigma})<0)>\text{TRH\_GC\_QUAL},$$

where $P(N(\text{mean}, \text{sigma})<0$ is the probability that a servo wedge's normal distribution is less than zero; and
TRH_GC_QUAL is a defined threshold.

7. The method of claim 1, wherein said defining a second distribution corresponding to poor quality servo wedges comprises computing a minimum Viterbi Metric Margin distribution that satisfies the following equation:

$$P(N(\text{mean},\text{sigma})<0)>\text{TRH\_GC\_QUAL},$$

where $P(N(\text{mean}, \text{sigma})<0$ is the probability that a servo wedge's minimum Viterbi Metric Margin distribution is less than zero; and
TRH_GC_QUAL is a defined threshold.

8. A system comprising:
a hard disk assembly comprising one or more hard disks each of which having one or more servo wedges;
a Gray code quality detector operably associated with the hard disk assembly and configured to:
read a servo wedge;
responsive to reading the servo wedge, measure a metric for the servo wedge; and
determine whether the metric is above or below a Gray code quality detector threshold that is defined between a first distribution corresponding to good quality servo wedges and a second distribution corresponding to poor quality servo wedges.

9. The system of claim 8, wherein to measure said metric is to measure a minimum Viterbi Metric Margin for the servo wedge.

10. The system of claim 8, wherein the first and second distributions are Gaussian distributions.

11. The system of claim 8, wherein the first and second distributions are minimum Viterbi Metric Margin distributions.

12. The system of claim 8, wherein said second distribution corresponding to poor quality servo wedges comprises a normal distribution that satisfies the following equation:

$$P(N(\text{mean},\text{sigma})<0)>\text{TRH\_GC\_QUAL},$$

Where $P(N(\text{mean}, \text{sigma})<0$ is the probability that a servo wedge's normal distribution is less than zero; and
TRH_GC_QUAL is a defined threshold.

13. The system of claim 8, wherein said second distribution corresponding to poor quality servo wedges comprises a minimum Viterbi Metric Margin distribution that satisfies the following equation:

$$P(N(\text{mean},\text{sigma})<0)>\text{TRH\_GC\_QUAL},$$

Where $P(N(\text{mean}, \text{sigma})<0$ is the probability that a servo wedge's minimum Viterbi Metric Margin distribution is less than zero; and
TRH_GC_QUAL is a defined threshold.

14. The system of claim 8, wherein to measure said metric is to measure a minimum Viterbi Metric Margin for the servo wedge and wherein the first and second distributions are Gaussian distributions.

15. The system of claim 8, wherein to measure said metric is to measure a minimum Viterbi Metric Margin for the servo wedge and wherein the first and second distributions are minimum Viterbi Metric Margin distributions.

16. A system-on-chip comprising:
a microprocessor; and
a Gray code quality detector associated with the microprocessor and configured to perform operations comprising:
reading a servo wedge;
responsive to said reading, measuring a metric for the servo wedge; and
determining whether the metric is above or below a Gray code quality detector threshold that is defined between a first distribution corresponding to good quality servo wedges and a second distribution corresponding to poor quality servo wedges.

17. The system-on-chip of claim 16, wherein measuring said metric comprises measuring a minimum Viterbi Metric Margin for the servo wedge.

18. The system-on-chip of claim 16, wherein the first and second distributions are minimum Viterbi Metric Margin distributions.

19. The system-on-chip of claim 16, wherein said second distribution corresponding to poor quality servo wedges comprises a normal distribution that satisfies the following equation:

$$P(N(\text{mean},\text{sigma})<0)>\text{TRH\_GC\_QUAL},$$

Where $P(N(\text{mean}, \text{sigma})<0$ is the probability that a servo wedge's normal distribution is less than zero; and
TRH_GC_QUAL is a defined threshold.

20. The system-on-chip of claim 16, wherein said second distribution corresponding to poor quality servo wedges comprises a minimum Viterbi Metric Margin distribution that satisfies the following equation:

$$P(N(\text{mean},\text{sigma})<0)>\text{TRH\_GC\_QUAL},$$

Where $P(N(\text{mean}, \text{sigma})<0$ is the probability that a servo wedge's minimum Viterbi Metric Margin distribution is less than zero; and
TRH_GC_QUAL is a defined threshold.

21. A method performed by a Gray code quality detector, the method comprising:
reading, by the Gray code quality detector, a servo wedge;
responsive to reading the servo wedge, measuring, by the Gray code quality detector, a metric for the servo wedge; and
determining, by the Gray code quality detector, whether the metric is above or below a Gray code quality detector threshold that is defined between a first distribution corresponding to good quality servo wedges and a second distribution corresponding to poor quality servo wedges.

22. The method of claim 21, wherein measuring the metric measures a minimum Viterbi Metric Margin for the servo wedge.

23. The method of claim 21, wherein the first and second distributions are Gaussian distributions.

24. The method of claim 21, wherein the first and second distributions are Viterbi Metric Margin distributions.

25. The method of claim 21, wherein the servo wedge contains track and sector ID information.

* * * * *